United States Patent
Sarkar et al.

(10) Patent No.: US 11,641,526 B2
(45) Date of Patent: May 2, 2023

(54) HIGH DYNAMIC RANGE CMOS IMAGE SENSOR BY PIXEL-EMBEDDED SIGNAL AMPLIFICATION AND METHOD THEREOF

(71) Applicant: DV2JS INNOVATION LLP., New Delhi (IN)

(72) Inventors: Mukul Sarkar, New Delhi (IN); Neha Priyadarshini, New Delhi (IN)

(73) Assignee: DV2JS Innovation LLP., New Delhi (IN)

( * ) Notice: Subject to any disclaimer, the term of this patent is extended or adjusted under 35 U.S.C. 154(b) by 0 days.

(21) Appl. No.: 17/406,671

(22) Filed: Aug. 19, 2021

(65) Prior Publication Data

US 2022/0070393 A1   Mar. 3, 2022

(30) Foreign Application Priority Data

Aug. 28, 2020  (IN) .............................. 202011037101

(51) Int. Cl.
| | |
|---|---|
| H04N 5/355 | (2011.01) |
| H04N 5/363 | (2011.01) |
| H04N 5/378 | (2011.01) |
| H04N 5/3745 | (2011.01) |
| H04N 25/57 | (2023.01) |
| H04N 25/65 | (2023.01) |
| H04N 25/75 | (2023.01) |
| H04N 25/771 | (2023.01) |
| H04N 25/778 | (2023.01) |

(52) U.S. Cl.
CPC ............. *H04N 25/57* (2023.01); *H04N 25/65* (2023.01); *H04N 25/75* (2023.01); *H04N 25/771* (2023.01); *H04N 25/778* (2023.01)

(58) Field of Classification Search
CPC .... H04N 5/355; H04N 5/363; H04N 5/37452; H04N 5/37457; H04N 5/378; H04N 5/3745
USPC ......................................................... 348/308
See application file for complete search history.

(56) References Cited

U.S. PATENT DOCUMENTS 6,465,786 B1 * 10/2002 Rhodes ............... H01L 27/1464
250/338.4
2005/0248673 A1 * 11/2005 Fowler .................. H04N 5/357
348/241

(Continued)

*Primary Examiner* — Lin Ye
*Assistant Examiner* — Chan T Nguyen
(74) *Attorney, Agent, or Firm* — Renner Kenner Greive Bobak Taylor & Weber (57) ABSTRACT

A method and a system are described for improving a dynamic range of a CMOS image sensor by pixel-embedded signal amplification. An electromagnetic radiation is incident for a predetermined duration on a pixel array including a plurality of photodiodes. The photodiodes release electrons in form of an input electronic signal and the released input signal is temporarily stored in a storage node. The said input signal is then transferred to a gate of an in-pixel amplifier, which is configured to dynamically alternate between modes of capacitance and switched biasing, using a single in-pixel switch. Then, the in-pixel amplifier is modulated while in capacitance mode for a voltage build-up and this augment gain of the input signal. Thereafter, the in-pixel amplifier alternates to a switched biasing mode for suppression of noise signals. Finally, a resultant electronic signal is generated with a high gain after processing and suppression of the noise signals.

22 Claims, 4 Drawing Sheets

(56) References Cited

U.S. PATENT DOCUMENTS

2008/0143860 A1* 6/2008 Sato .................... H04N 5/3741
                                                        348/E7.001
2022/0190016 A1* 6/2022 Dupoiron .......... H01L 27/14667

* cited by examiner

FIG. 4

HIGH DYNAMIC RANGE CMOS IMAGE SENSOR BY PIXEL-EMBEDDED SIGNAL AMPLIFICATION AND METHOD THEREOF

FIELD OF THE INVENTION

The present disclosure relates to an improved high dynamic range complementary metal-oxide semiconductor (CMOS) image sensor by pixel-embedded signal amplification and more specifically to a circuit-based pixel-embedded signal amplification, to enhance a signal to noise ratio in a low-light environment. This invention also relates to a method of use of such an improved high dynamic range CMOS image sensor.

BACKGROUND OF THE INVENTION

Digital photography has advanced in leaps and bounds, incorporating features of advanced cameras in compact photographic devices due to rapid developments in image processing techniques. In spite of the technological advancements, photography in low light conditions still poses a challenge to technologists working in this field. Even the available advanced cameras have failed to provide better efficiency and high resolution of picture in low-light conditions.

Availability of light is a fundamental requirement for any digital camera, to process a captured image and render a high-resolution image as an output. This is the very reason, why photography in low-light conditions renders an image of inferior quality. Obtaining a high-resolution image in low-light conditions is very important when it comes to applications inter alia in medical equipment, warfare equipment and in and defense related high resolution camera technologies. For instance, low-light imaging may find a necessary use in advanced night-vision capable drones, endoscopic capsule, fluorescence microscopy, astrophotography, and other night-vision optics and surveillance applications.

There are image sensors available which have tried to attend the problems of low-light photography. However, the images rendered are of an inferior resolution and are normally laden with noise signals. This is because the input signal is weak due to presence of a fewer number of photons. As a result, a weak photoelectric signal is generated with a low voltage. Traditionally, state of the art sensors amplify this low-level voltage signal in order to obtain a high gain, to output are fined image. This process consumes more power and makes the digital camera expensive and less effective.

Traditionally, sensors like CCD (Charged Coupled Device), Electron bombardment CCDs, photomultiplier tubes, SPADs (Single Photon Avalanche Diodes) and conventional CMOS sensors are used in digital cameras for low-light photography. Conventional CCD image sensors were intended for low noise and high gain imaging. In an electron bombardment CCD, a photocathode made from GaAs, GaAsP (Gallium Arsenide and Gallium Arsenide Phosphide as substrates) is used for emission of photo electrons in vacuum. Further, a high electric field is applied to accelerate the photoelectrons at high velocities and they are bombarded on the anode (Silicon). This creates additional electron-hole pairs and thus the gain is provided. These imaging systems are costly. Further, the gain factor in traditional sensors is non-linear over time.

Similarly, Photomultiplier tubes (PMTs) are based on the same principle of CCDs. This architecture uses phosphor screen as photo-cathodes which generates electrons in response to photon. The electrons travel through a high energy electric field in vacuum with high velocity. The electrons, now in a higher energy shell, are transferred through multi-channel photo multiplier tubes. Thereafter, they hit a screen made of phosphor which converts the high energy electrons back into light. Thus, in PMTs, a high gain is obtained due to increased number of photons, which in turn increases the photoelectric efficiency. The resultant effect is a requirement of additional hardware which makes a PMT circuitry bulky.

Single Photon Avalanche Diodes (SPADs) operate by applying a breakdown voltage in reverse bias condition so that the avalanche in the electric field produces multiple negatively charged carriers corresponding to a very few photons (or even one photon).

Conventional CMOS sensors have enabled the single-chip design of an imaging system and have also provided a cost-effective alternative. However, conventional CMOS sensors suffer from low dynamic range (DR), when exposed to low-light or bright-light conditions, thereby affecting the image quality. A typical CMOS sensor overcomes the aforementioned problems of high voltage requirement, by amplifying the input signal even before its conversion in voltage terms. Most of the CMOS sensors use a static amplifier to amplify an accumulated charge before outputting a signal with a higher voltage. Hence, a conventional CMOS sensor has a static amplifier and a capacitor for its operation. The resultant output is a signal (image), comparatively with a better resolution but laden with noise and with a compromised gain.

U.S. Ser. No. 10/419,701 relates to a digital pixel image sensor with a low integration time of light on a pixel, which comprises a digitizer, a photodiode, comparator, a clock counter, a charge storage device, and a pixel memory. More specifically, it discloses a digital pixel image sensor which includes a digitizer (e.g., ADC) in each pixel, where the digitizer digitizes an analogue-output from a photodiode of the pixel using a comparator, a reference ramp signal, and a counter. A pixel includes a digital or an analogue-correlated-double sampling (CDS) circuit to reduce noise and provide a higher dynamic range. Further, the disclosed comparator has a pre-charging circuit, rather than a constant biasing circuit, to reduce the power consumption of each digital pixel.

U.S. Ser. No. 10/070,084 relates to a device for increasing the dynamic range of an image sensor. The image sensor uses spatial adaptive on-chip binning to enhance low-light photography. This image sensor fundamentally works on combining at least two signals to render a high-resolution image in low light environments. The image sensor comprises a plurality of pixels, at least two shift registers, and one amplifier for processing at least two images. Thus, US '084 works by producing two images and processing a resultant image by comparing the ideal features from both the images, thereby having a longer clock cycle.

Conventional CMOS sensors operate in low-light conditions, but with low noise-suppression capabilities. Additionally, these existing CMOS sensors require longer clock cycles and require additional hardware components which make the circuitry bulky and power consuming. The inventions lack a single transistor-based approach for performing more than one operation.

SUMMARY OF THE INVENTION

There is a need for a more effective, competent, efficient, compact, economical, low-power-consuming and a high dynamic range CMOS image sensor, which uses in-pixel (photo-signal) amplification and switched biasing to enhance the signal to noise ratio (SNR) in a low-light condition.

The present invention relates to an improved high dynamic range CMOS image sensor for a pixel-embedded signal amplification to enhance the signal to noise ratio (SNR) in the low-light environment. The improved high dynamic range CMOS image sensor is configured to operate using a single in-pixel switch which enables an in-pixel amplifier to have a dual operation. The in-pixel amplifier is thus dynamic rather than static in the proposed invention.

The improved high dynamic range CMOS image sensor uses in-pixel amplification and switched biasing of the in-pixel amplifier to enhance the signal to noise ratio in the low-light environment. The in-pixel amplification, amplifies an input electronic signal before it is buffered, thus achieving a higher signal-to-noise-ratio. The switched biasing method reduces the low frequency noise, further improving the dynamic range of the CMOS image sensor.

The improved high dynamic range CMOS image sensor includes a novel arrangement of the in-pixel amplifier which is configured to be a capacitor for part of the operation, a photodetector, an in-pixel switch, and a control terminal operating in such a manner to achieve pixel-embedded signal amplification. The novel arrangement implements the method of in-pixel (photo-signal) amplification to enhance the signal to noise ratio in the low-light environment.

In another aspect of the invention, the in-pixel switch is used for both amplification and readout. The in-pixel switch enables a higher fill-factor (ratio of the photodiode area over the pixel area). Various switches and other control signals operate in the pixel to control the switches. Switches $S_{P1}$ and $S_{P2}$ aid the pixel for signal amplification and switched biasing. Switches $S_H$, $S_{RST}$, and $S_{SEL}$ are control switches to transfer the pixel information to a column circuit.

In another aspect of the invention, a digital camera uses an image sensor formed out of an array of photosensitive pixels to capture an incident light. Further, an image processor is linked to the CMOS image sensor. Further, the CMOS image sensor determines corresponding intensities of individual component of light by measuring the amount of accumulated charge in each type of pixel. Accordingly, respective components of light captured by the pixels, are represented in the resulting digital image, which for instance may be red, green and blue colour components, although other digital colour representations exist as well. Also, a memory (not necessarily shown in Figures) is present which is communicatively connected to the processor and stores processor (not necessarily shown in Figures) instructions. The memory on execution, causes the processor to receive light for a predetermined duration on a pixel array and implement the method for pixel-embedded signal amplification.

According to an embodiment illustrated herein, the present disclosure relates to a method for pixel-embedded signal amplification. The method includes:
receiving light for a predetermined duration on a pixel array, including a plurality of photodiodes, wherein the predetermined duration is an integration time or an exposure time;
releasing an input electronic signal by an excitation of a depletion region of the plurality of photodiodes, wherein the released input electronic signal, due to release of electrons, is temporarily stored in a storage node;
transferring the input electronic signal from the storage node to a gate of an in-pixel amplifier, wherein the in-pixel amplifier is configured to be in a capacitance mode;
modulating the in-pixel amplifier in the capacitance mode for a voltage-build, wherein the voltage build-up augments gain of the input electronic signal to a predetermined level;
alternating the in-pixel amplifier to a switched biasing mode for suppression of low-frequency noise signals; and
rendering a resultant output electronic signal with an increased gain.

As a result, the processing of the signal is implemented in a column buffer and the resultant electronic signal is then transferred to a column read out circuit for reconstruction of an image from the resultant electric signal. Further, the aforesaid method also provides switched biasing and helps to suppress the low-frequency noise signals in the circuit of the CMOS sensor.

The summary is provided to introduce the system and method of representative concepts in a simplified form that are further described below in the detailed description. This summary is not intended to limit the key essential features of the present invention nor its scope and application.

Other advantages and details about the system and the method will become more apparent to a person skilled in the art from the below detailed description of the invention when read in conjugation with the drawings.

BRIEF DESCRIPTION OF THE ACCOMPANYING DRAWINGS

The accompanying drawings, which are incorporated and constitute a part of this disclosure, illustrate exemplary embodiments and, together with the description, serve to explain the disclosed invention. In the figures, the digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagram herein represents conceptual views of illustrative systems embodying the principles of the present subject matter. Similarly, it will be appreciated that any flow charts, flow diagrams, state transition diagrams, illustrative circuit architectures, and the like represent various processes which may be substantially executed by a computer or processor, whether or not such computer or processor is explicitly shown.

DETAILED DESCRIPTION OF THE DRAWINGS

The present invention can be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application yield multiple alternative and suitable approaches to implement the functionality of any detail described herein. Therefore, any approach extends beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, circuit, architecture, characteristic, property, element, or limitation but that not every embodiment or example necessarily includes that particular feature, circuit, architecture, structure, characteristic, property, element, or limitation. Further, repeated use of the phrase "in an embodiment" does not necessarily refer to the same embodiment.

TERMS

It is to be understood that the singular forms "a," "an" and "the" include plural referents unless the context clearly dictates otherwise.

The terms and words used in the following description are to be understood in the manner used by the inventor to enable and describe the invention. For further clarity and to enable better understanding of the invention, certain abbreviations/key terms are being defined herein under.

| Abbreviations | Meaning |
| --- | --- |
| PD | Photodiode/Photodetector |
| $S_{RST}$ | Reset Switch |
| SD | Storage Node |
| $C_{PAR}$ | Parasitic Capacitance |
| SF | Source Follower (In-pixel amplifier) |
| $S_{PA}$ | In-pixel switch |
| $S_{SEL}$ | Select Switch |
| $V_{PA}$ | Voltage Preamplifier (Control Terminal Voltage) |
| $S_{P1}$ and $S_{P2}$ | Alternator switches |

DESCRIPTION

The improved high dynamic range CMOS image sensor operates by pixel-embedded signal amplification to enhance the signal to noise ratio (SNR) in the low-light environment. The improved high dynamic range CMOS image sensor uses an in-pixel switch to configure the in-pixel amplifier (source follower) to have a dual-mode operation, which is dynamic. As a result, a high signal to noise ratio is achieved by amplifying an electronic signal before voltage conversion and simultaneously reducing noise in the output signal by the switched biasing technique. The configuration of the CMOS image sensor is such that it is configured to alternate between the stage of amplification and the stage of read out of the signal.

The improved high dynamic range CMOS image sensor in accordance to the present invention enhances the following:

signal to noise ratio (SNR) in low light environment using the CMOS image sensor;

signal, by amplification in the pixel. The signal is amplified by modulating a capacitance and therefore, the amplification is a linear;

dynamic range, while retaining a 4T conventional pixel architecture. The retention of the pixel architecture does not affect the pixel fill factor and therefore, has no loss in the photodiode sensitivity; and SNR and dynamic range by suppressing the low frequency noises of the CMOS sensor circuit. The noise signals in the circuit of the CMOS image sensor are suppressed by switched biasing of the in-pixel switch.

The improved high dynamic range CMOS image sensor is more effective, competent, efficient, compact, and economical and uses the method of in-pixel amplification and switched biasing, to enhance the signal to noise ratio is the low-light environment. Further, it also consumes less power during low-light photography.

The present invention discloses a dynamic dual function in-pixel amplifier. The in-pixel switch is configured to be in ON state during charge accumulation in the capacitance stage and be in the OFF state during the amplification stage. Thus, a single switch enables the in-pixel amplifier to have a dual operation of capacitance and amplification, thereby reducing hardware requirements in circuit architecture of the CMOS image sensor. The present invention also employs capacitive modulation within the pixel itself using the in-pixel switch. The in-pixel switch is used for both amplification and read out. As a result, the present invention has a high quantum efficiency and thereby negates a requirement of electron bombardment, a high energy electric field, a high supply voltage and additional hardware.

Figure 1:
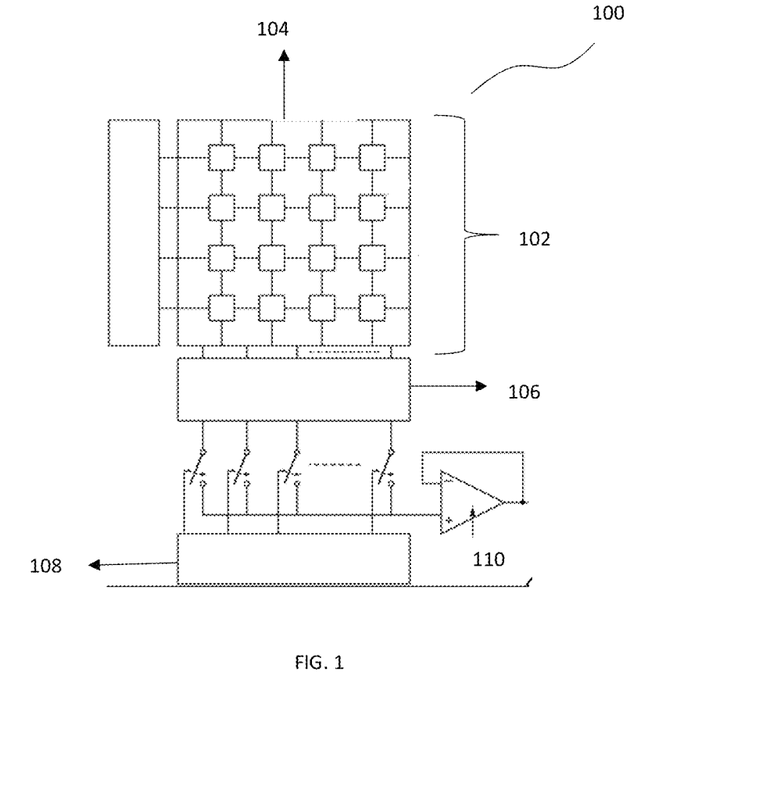
FIG. 1 is a block diagram that illustrates a conventional CMOS sensor.

FIG. 1 is a block diagram that illustrates a conventional CMOS sensor 100. The conventional CMOS sensor 100 includes a pixel array 102, a plurality of pixels (core) 104, a column readout 106, a column decoder 108 and a column level buffer 110. The pixel array 102 includes a plurality of pixels 104 as a unit of area, where light is incident on the plurality of pixels 104. Each pixel core has a photodiode, which is sensitive to incident light of the visible spectrum. The pixel array 102 is communicatively coupled to the column readout 106, which is a circuit used to convert information on variation of capacitance due to an external acceleration into a voltage signal. It is mainly a photocurrent in voltage terms by reading it from the pixel array 102. The column readout 106 is connected to the column decoder 108 which selects pairs of bit lines from the pixel array 102 and represents the data stored in bits as a readable output. FIG. 1 thereby illustrates a basic schematic requirement for a conventional CMOS sensor 100 which provides photography in low light but with noise. Further, the conventional CMOS sensor 100 consumes more power during low-light photography. Thus, a need was felt for a more effective, competent, efficient, compact, less power consuming, economical and a high dynamic range CMOS image sensor which uses in-pixel amplification and switched biasing to enhance the signal to noise ratio (SNR) in a low-light condition.

Figure 2:
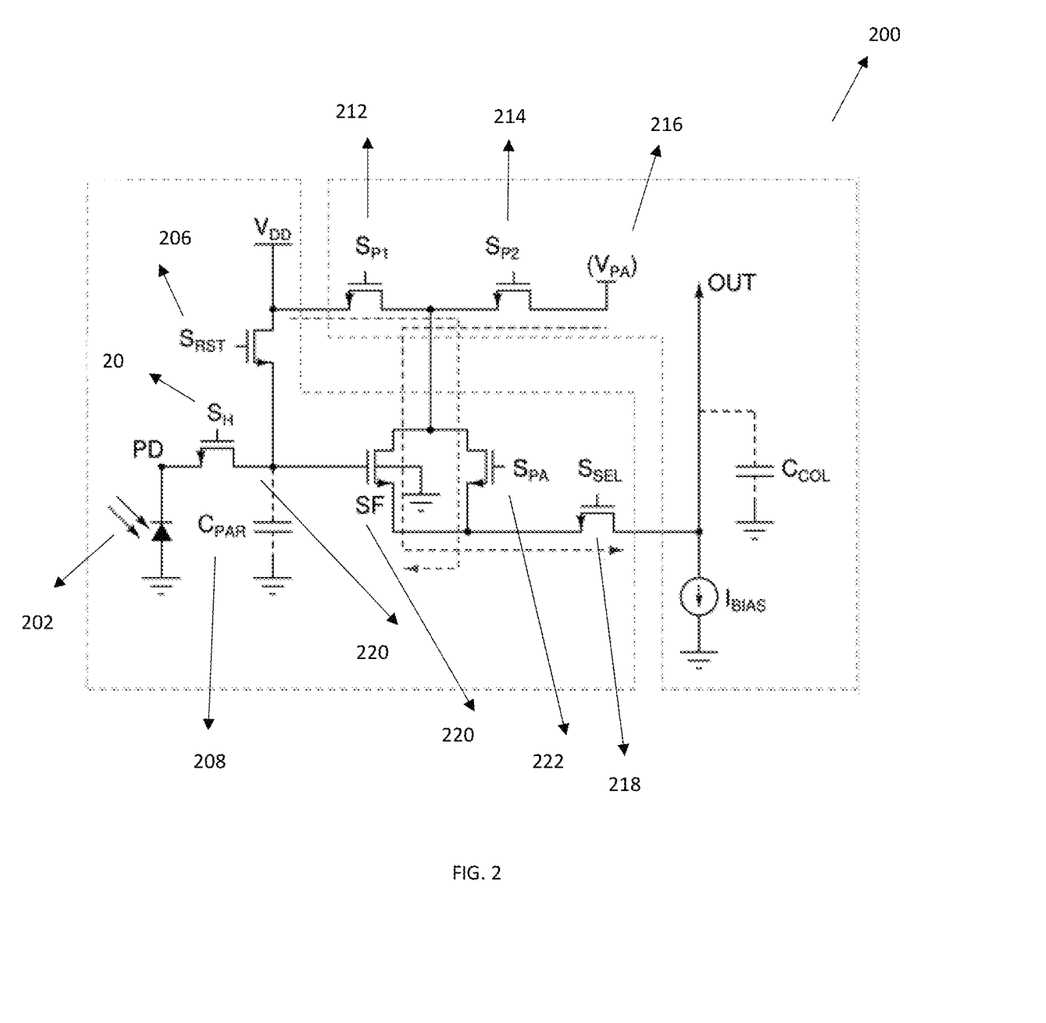
FIG. 2 is a block diagram that illustrates a circuit architecture of the improved high dynamic range CMOS image sensor in accordance with the present invention.

FIG. 2 is a block diagram that illustrates a circuit architecture of the improved high dynamic range complementary metal-oxide semiconductor (CMOS) image sensor 200. The circuit architecture of the improved high dynamic range CMOS image sensor 200 inter alia includes a photodetector 202, an in-pixel amplifier 210, an in-pixel switch $S_{PA}$ 222, two alternator switches $S_{P1}$ 212 and $S_{P2}$ 214, a capacitance $C_{PAR}$ 208 a storage node 220, and other switches: $S_H$, 204, $S_{RST}$ 206, and $S_{SEL}$ 218.

In an embodiment, the photodetector 202 is pinned to every pixel in the pixel array 102. The pixel array 102 includes a plurality of pixel cores as a unit of area, where electromagnetic radiation is incident on the pixel cores (or pixels 104) and releases a number of photoelectrons. These photoelectrons in other terms may also be referred as an input electronic signal. In an embodiment, the pixel array 102 is a layered substrate. First, the reset switch ($S_{RST}$ 206) is set to zero and the photo detector 202 is exposed to light from the visible spectrum for a predetermined duration. In an exemplary embodiment, an electromagnetic radiation may be light, from the range of infrared to visible light. In an embodiment, the photodetector 202 is an n-well/p-sub Silicon substrate photodiode. The in-pixel amplifier 210 is configured to alternate between stages of capacitance and switched biasing. The Switches $S_{PA}$ 222, $S_{P1}$ 212 and $S_{P2}$ 214 are configured to enable the circuit to alternate from the charge amplification stage to the switched biasing stage. In addition to the two alternator switches $S_{P1}$ 212 and $S_{P2}$ 214, the circuit is further configured with a plurality of control switches, namely: $S_H$ 204, $S_{RST}$ 206, and $S_{SEL}$ 218. $S_{RST}$ 206 are set switch which resets the photo diode to zero. Further, $S_H$ 204 is configured to operate with $S_{P1}$ 212 during the capacitance mode of the in-pixel amplifier 210 and $S_{SEL}$ 218 is configured to operate with $S_{P2}$ 214 during the switched biasing mode of in-pixel amplifier 210. $C_{PAR}$ 208 is a parasitic capacitor of the circuit which is connected to the ground. In an embodiment, $C_{PAR}$ 208 is configured to remove stray noise signals to the ground, as they cannot be suppressed or filtered. The storage node 220 in the circuit is configured to store accumulated electrons/charges generated due to the photoelectric effect on the photodiode 202. The input gate of the in-pixel amplifier 210 acts as the storage node 220 of the circuit.

During operation of the CMOS image sensor 200, light is incident on the photodiode 202 for a time duration and this time duration may be configurable by a user. This produces electrons as an input electric signal (photo-electrons) which is stored in a capacitor when the in-pixel amplifier 210 is in capacitance mode. The time duration may be an integration period or an exposure time, for which the photodiode 202 captures the photons. After the integration period, the photodiode 202 produces electrons which are stored in the capacitor when the in-pixel amplifier 210 is in capacitance mode.

Further, when the electrons are accumulated during the capacitance mode, the two alternator switches, $S_{P1}$ 212 and $S_{P2}$ 214, then enables modulation of capacitance to optimized levels to obtain a desired voltage of the accumulated electrons. There is modulation of voltage to render a higher voltage and hence a higher gain of the signal due to the accumulation of the electrons.

The in-pixel amplifier 210 is then turned OFF using $S_{PA}$ 222, and $S_{P2}$ 214, and $S_{SEL}$ 218 enables the circuit to enter the switched biasing mode. In another embodiment, the switched biasing mode enables suppression of the low-frequency signals to reduce noise from the resultant signal. The suppression of the low-frequency signals includes segregating the input signal from the low-frequency noise signals during the voltage build-up in the capacitance mode and then suppressing residual noise signals by a parasitic capacitance operation by grounding the residual noise signals in the switched biasing mode. In a further embodiment, the column level buffer 110 acts as a bridge between two nodes in any exemplary circuit. The column readout 106 is a readout circuit to represent variation of capacitance due to an external acceleration into a voltage signal. It converts a photocurrent into an electric charge or voltage by reading it from the array of pixels 102. The column decoder 108 is a circuit to select pairs of bit lines from the pixel array 102 and represent the data stored in bits as a readable output.

In another embodiment of the invention, a method for pixel embedded signal amplification using the improved high dynamic range CMOS image sensor 200 is disclosed. The method includes:

receiving light for a predetermined duration on a pixel array, including a plurality of photodiodes, wherein the predetermined duration is an integration time or an exposure time;

releasing an input electronic signal by an excitation of a depletion region of the plurality of photodiodes, wherein the released input electronic signal, due to release of electrons, is temporarily stored in a storage node;

transferring the input electronic signal from the storage node to a gate of an in-pixel amplifier, wherein the in-pixel amplifier is configured to be in a capacitance mode;

modulating the in-pixel amplifier in the capacitance mode for a voltage-build, wherein the voltage build-up augments gain of the input electronic signal to a predetermined level;

alternating the in-pixel amplifier to a switched biasing mode for suppression of low-frequency noise signals; and rendering a resultant output electronic signal with an increased gain.

Figure 3:
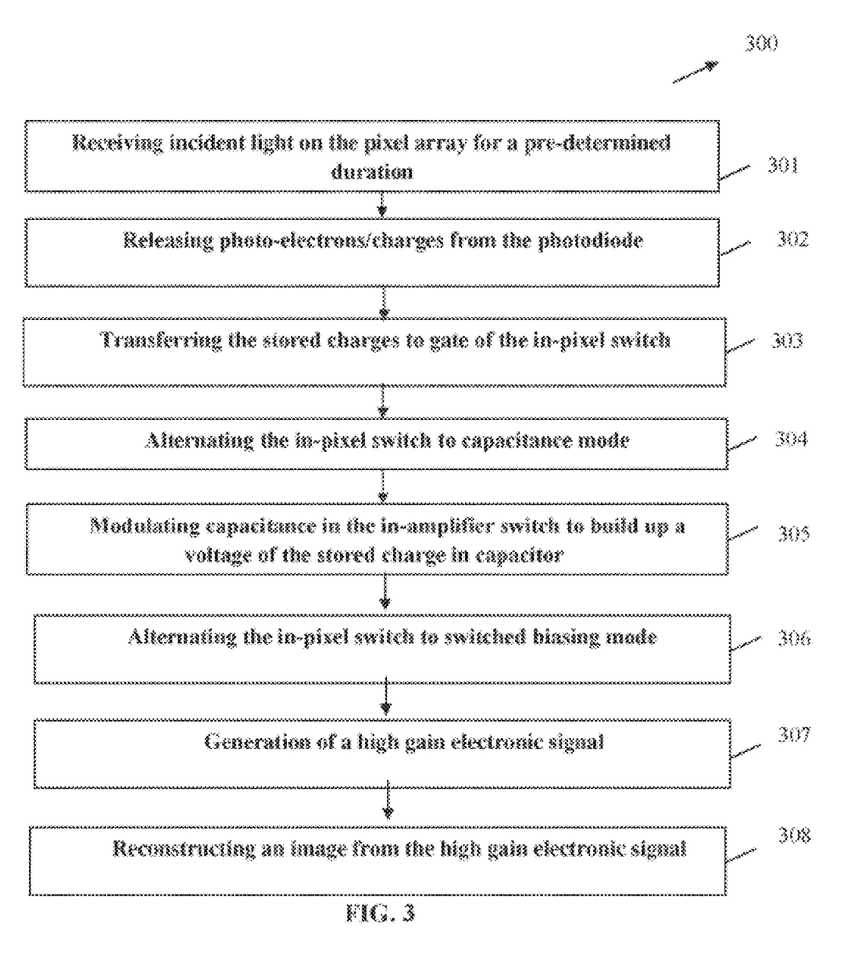
FIG. 3 is a flow chart that illustrates a method for pixel-embedded signal amplification using the improved high dynamic range CMOS image sensor in accordance with the present invention.

FIG. 3 is a flow chart 300 that illustrates a method for pixel-embedded signal amplification using the improved high dynamic range CMOS image sensor 200.

At step 301, electromagnetic radiation is incident on the photodiode 202 for a pre-defined integration time (exposure period). The integration time or the exposure period is defined as the time duration for which the photons are collected in the pixel 104. For example, it is the time for which light is allowed to be incident on the plurality of pixels 104. In an exemplary embodiment, a photographer may further control this time duration by changing a shutter speed of a camera or by altering the aperture of the lens of the camera. The modulation of the shutter speed, correspondingly increases or decreases the time frame of capturing the photons on the plurality pixels 104. And by the modulation of the aperture of the lens, the user allows an amount of light incident on the pixels 104, without requiring a larger pixel array/area in the CMOS image sensor 200.

At step 302, after the photons are integrated on the plurality of pixels 104, the photodiode 202 releases the electrons, which are temporarily stored in the storage node 220. This releasing of electrons, generates the input electronic signal by an excitation of a depletion region of the plurality of photodiodes 202, wherein the released input electronic signal, due to the releasing of electrons, is temporarily stored in a storage node 220. Simultaneously, the in-pixel amplifier 210 is switched ON (using the in-pixel switch $S_{PA}$ 222) to act as a capacitor.

At step 303, the electrons which are in the storage node 220, are then sucked-into the input gate of the in-pixel amplifier 210. Thus, the present invention does not require high supply voltages to accelerate the electrons to a higher energy shell. At this step, the input electronic signal is transferred from the storage node 220 to a gate of an in-pixel amplifier 210, wherein the in-pixel amplifier 210 is configured to be in a capacitance mode. Once the electrons are in the input gate of the in-pixel amplifier 210, there is a voltage build-up due to a modulation of the capacitance of the capacitor.

At step 304, the in-pixel amplifier 210 is configured to be in to the capacitance mode.

At step 305, the capacitance of the in-pixel amplifier 210 is modulated to increase or decrease to voltage on the gate of the in-pixel amplifier 210 (which is now configured as a capacitor). This modulation is achieved by the alternator switches $S_{P1}$ 212 and $S_{P2}$ 214, which augment the voltage build-up by modulating the capacitance to a desired level. For example, the desired level can be such that the conversion gain output is greater than 300 μV/e (micro Volts/electron).

Further, at step 306, once the electric signal is produced due to the voltage build-up, the in-pixel switch 222 goes into OFF mode by turning the select switch $S_{SEL}$ 218 ON, which now connects the pixel array 102 to the column level buffer 110. At this stage, the in-pixel amplifier 210 is configured to alternate to the switched biasing mode for suppression of noise signals. This is implemented to suppress the low-frequency noise signals from a resultant electronic signal, which is then passed to the column level buffer 110.

Then at step 307, the buffering operation is enabled to transfer in formation from one node to the other in the CMOS image sensor 200. The output electronic signal is transferred from the gate of the in-pixel amplifier 210 to the column buffer circuit 110 for further processing. Thus, when the noise signals are suppressed, the output electronic signal is then processed in column level buffer circuit 110.

Finally, at step 308, a resultant digital image is reconstructed using the column readout circuit 106.

In an embodiment, the modulation of capacitance works on the underlying principle Of $V=Q*C=n*q*C$, where V is the voltage, Q is the total charge measured in coulombs, C is the capacitance of the in-pixel amplifier 210 in capacitance mode, n is the number of electrons and q is the elementary charge. It is to be noted that in contrast to a conventional capacitance modulation which employs a number of switches, the present invention discloses modulation of capacitance within the pixel 104 itself, using a single in-pixel switch 222 where the in-pixel switch 222 dynamically toggles the in-pixel amplifier 210 between the modes of capacitance and switched biasing. In this, voltage V is directly proportional to capacitance C and the charge Q is constant due to a fixed number of electrons/charges. This amplification of the capacitance to increase the voltage negates requirement of a high supply voltage, and as a result the resultant electronic signal has a high gain. The resultant electronic signal is further processed by suppression of low-frequency signals. This suppression includes segregating the input signal from the low-frequency noise signals during the voltage build-up in the capacitance mode and then suppressing the residual noise signals by a parasitic capacitance operation in the switched biasing mode.

FIG. 3 has further been detailed as a flow of events, where the CMOS image sensor 200 implements the method steps sequentially. In operation, the method begins with a photodiode 202 reset followed by photo-signal integration on the PD (photodiode 202) node. Then, the signal charge (electrons) are transferred from the photodiode 202 to storage node 220 by turning switch $S_H$ 204 ON after the integration period, and as (in-pixel switch) switch $S_{P4}$ 222 remains ON, the in-pixel amplifier 210 acts as a MOS (metal oxide semiconductor) capacitor. Thereafter, the capacitance modulation for a voltage-build occurs during a parametric operation and enhances the conversion gain of the CMOS sensor 200 for the resultant signal with an enhanced gain. After parametric operation is completed, the switch $S_{P4}$ 222 is turned OFF and the in-pixel amplifier 210 resumes its buffering operation to readout the signal stored on the parasitic capacitance ($C_{PAR}$) 208. The low frequency noise of the in-pixel amplifier 210 is added to the electronic signal and affects the signal-to-noise ratio (SNR) at this stage. The low frequency noise of the in-pixel amplifier 210, depends not only on the present bias state but also the previous bias state of the CMOS sensor 200.

Thus, the pixel 104 is made to alternate between two bias states during the alternating phase. When the switches $S_{P4}$ 222 and $S_{P1}$ 212 are ON, $S_{P2}$ 214 is OFF, which is the capacitance modulation stage, where the source-drain terminal of the in-pixel switch 222 is shorted and connected to a high potential. This makes the channel below the gate of the in-pixel switch 222, pass into forceful depletion. Thus, with the help of switches $S_{P4}$ 222, $S_{P1}$ 212 and $S_{P2}$ 214, the circuit of the CMOS sensor 200, inherently has a way of keeping the channel depleted. This reduces the interaction between the Si—SiO$_2$ (silicon dioxide) interface traps and the free charges from the circuit of the CMOS sensor 200.

In the other alternate mode of the in-pixel amplifier 210, when switches $S_{P4}$ 222 and $S_{P1}$ 212 are OFF, switches $S_{P2}$ 214 and $S_{SEL}$ 218 are turned ON. The in-pixel amplifier 210 is then connected to the column current source and is biased in inversion with its drain connected to the externally controlled potential $V_{P4}$ 216. In an embodiment, $V_{P4}$ 216 is a voltage source. The voltage source is a ready voltage available, which is higher than the input signal but lower than the build-up voltage after capacitive modulation. $V_{P4}$ 216 augments the input signal in building a higher resultant voltage. Thus, in the present embodiment, $V_{P4}$ 216 is always kept high to a set level to enable the in-pixel switch 222 to always be in saturation.

Thereby, once the electrons are developed when $S_{P1}$ 212 is ON in the depletion stage, a higher potential is applied to the in-pixel switch's 222 gate, which sucks the electrons from the channel's circuit. Now, the in-pixel amplifier 210 is in inversion stage and the buffering operation is initiated. Therefore, when the in-pixel amplifier 210 is alternated periodically, between the stages of depletion and inversion, the low frequency noises are suppressed. The residual noise signals which cannot be suppressed, are prevented from going as tray by the parasitic operation of the capacitance $C_{PAR}$ 208 which is connected to the ground. As a result, this sucks the residual noise signals from the circuit.

The final phase in the operation of the CMOS image sensor 200 is the signal readout phase. The periodic switching of the in-pixel amplifier 210 between depletion and inversion, lowers the readout speed from the readout circuit 106, affecting the frame rate. For a high frame rate and reduced noise, the in-pixel amplifier 210 is switched between depletion and inversion only once and then switched for signal readout. The correlation time between the traps are reset to ZERO, lowering the noise with no compromise on speed of operation. In a further embodiment, to shorten the inversion time, multiple accumulation-inversion cycles may be used to achieve further reduction in noise signals.

In an exemplary embodiment, the input electronic signal is preserved at the storage node 220 and is readout only when the in-pixel amplifier 210 is in inversion. The switches $S_{P4}$ 222, $S_{P1}$ 212 and $S_{P2}$ 214 are implemented using an nMOS transistor (n-type) and boot strapped to bias them in linear region. The plurality of pixels 104 provides an integrated signal by keeping $S_{P4}$ 222 and $S_{P2}$ 214 OFF and keeping $S_{P1}$ 2120N during the entire circuit operation. In this case, since $S_{P1}$ 212 is always ON, $S_{SEL}$ 218 is switched ON whenever the signal needs to be read.

Figure 4:
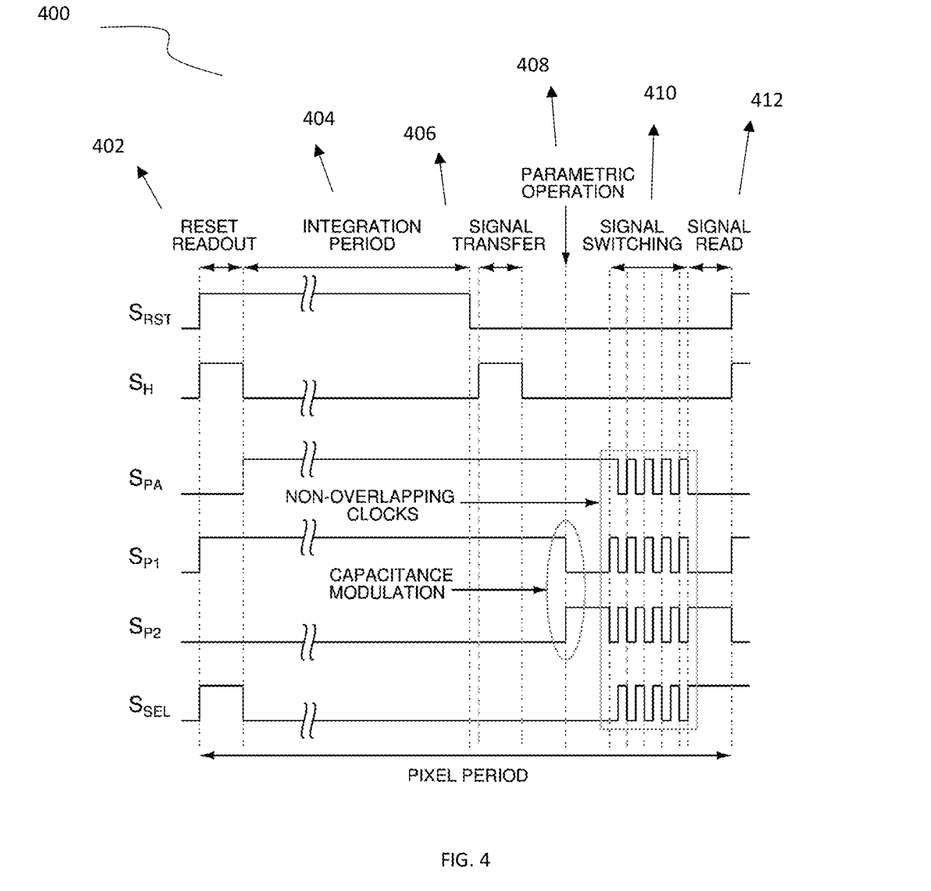
FIG. 4 illustrates a timing diagram architecture of the improved high dynamic range CMOS image sensor in accordance with the present invention.

FIG. 4 illustrates a timing diagram architecture of the improved high dynamic range CMOS image sensor 200 in accordance with the present invention. The timing diagram describes an implementation of the method steps as a clocking cycle at every consecutive interval. The operation starts at $T_0$ 402 and ends at $T_5$ 412. $T_0$ 402 is the Reset Readout phase. $T_1$ 404 is the integration period stage, which defines for how long the plurality of pixels 104 are exposed to incident light. The integration time or the exposure period is defined as the time duration for which the photons are collected in the plurality of pixels 104. Once the photons are integrated in the plurality of pixels 104, electrons are released from the photodiode 202. The electrons are transferred to the input gate of the in-pixel switch 222 in the Signal.

Transfer Phase $T_2$ 406. Then, the capacitance modulation takes place at the parametric operation phase $T_3$ 408, once the electrons are generated for voltage amplification. The clocking cycle then enters $T_4$ 410 after an electronic signal is generated with an amplified voltage. $T_4$ 410 is the switching phase where the in-pixel amplifier 210 due to the operation of $S_{P2}$ 214 and $S_{SEL}$ 218, alternates to the switched biasing state. The suppression of noise signals happens in the switched biasing state of the in-pixel amplifier 210, where the electric signal enters the column buffer circuit 110 for further processing. After processing, the clock cycle enters the Signal Readout stage at $T_5$ 412, where a digital image is reconstructed from the column readout circuit 106. After completion of $T_5$ 412, the in-pixel switch 222 alternates back to ON state due to the operation of the $S_{P1}$ 212 switch and the clock cycle again enters $T_0$ 402 state.

In another embodiment of the invention, an image processor which is linked to the CMOS sensor 200, determines corresponding intensities of each raw color component of light by measuring the amount of accumulated charge in the plurality of pixels 104. In an exemplary embodiment, the plurality of pixels 104 in the resulting digital image are represented by color component values, which may be red, green and blue components, although other digital color representations exist as well. Also, a memory is present which is communicatively connected to the processor and stores processor instructions. The memory on execution, causes the processor to receive light for a predetermined duration on a pixel array.

In an embodiment, the processor includes suitable logic, circuitry, interfaces, and/or code that are configured to execute a set of instructions stored in the memory. The processor is configured to be implemented based on a number of processor technologies known in the art. Examples of the processor include, but not limited to, image processors or digital signal processors or, an X86-based processor, a Reduced Instruction Set Computing (RISC) processor, an Application-Specific Integrated Circuit (ASIC) processor, a Complex Instruction Set Computing (CISC) processor, and/or other processor.

The memory may include suitable logic, circuitry, interfaces, and/or code that are configured to store the set of instructions, which is executed by the processor. The memory is configured to store one or more programs, routines, or scripts that is executed in coordination with the processor. The memory may be implemented based on a Random Access Memory (RAM), a Read-Only Memory (ROM), a Hard Disk Drive (HDD), a storage server, and/or a Secure Digital (SD) card.

A description of an embodiment with several components in communication with each other does not imply that all such components are required. On the contrary, a variety of optional components are described to illustrate the wide variety of possible embodiments of the invention.

The present disclosure may be realized in hardware, or a combination of hardware and software. The present disclosure may be realized in a centralized fashion, in at least one processing system, or in a distributed fashion, where different elements may be spread across several interconnected systems or circuits.

Further, any of the methods described herein may be totally or partially performed using a digital camera, including one or more processors, which is configured to perform the steps described herein above. Thus, embodiments are directed towards a digital camera including specific components to perform specific steps of any of the methods described herein above. Additionally, any of the steps of any of the methods can be performed using specific circuits.

A person with ordinary skills in the art will appreciate that the systems, circuit elements, modules, and submodules have been illustrated and explained to serve as examples and should not be considered limiting in any manner. It will be further appreciated that the variants of the above disclosed circuit elements, modules, and other different systems or applications.

While the present disclosure has been described with reference to certain embodiments and exemplary embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope.

We claim:

1. A method for improving a dynamic range of a CMOS image sensor by pixel-embedded signal amplification, the method comprising:
   receiving, by a CMOS image sensor, an electromagnetic radiation for a predetermined duration on a pixel array when a reset switch is deactivated, wherein the pixel array comprises of a plurality of photodiodes;
   releasing, by the CMOS image sensor, an input electronic signal by an excitation of a depletion region of the plurality of photodiodes, wherein the released input electronic signal, due to the releasing of electrons, is temporarily stored in a storage node;
   transferring, by the CMOS image sensor, the input electronic signal from the storage node to a gate of an in-pixel amplifier, wherein the in-pixel amplifier is configured as a capacitor;
   modulating the capacitance of the in-pixel amplifier by changing the depletion and/or inversion state of the in-pixel amplifier, for a voltage-build, wherein the voltage build-up augments gain of the input electronic signal to a predetermined level;
   alternating, by the CMOS image sensor, the in-pixel amplifier to a switched biasing mode for suppression of low-frequency noise signals; and
   rendering, by the CMOS image sensor, a resultant output electronic signal with increased gain.

2. The method as claimed in claim 1, wherein the electromagnetic radiation is in the range of infrared to visible light.

3. The method as claimed in claim 1, wherein the plurality of photodiodes is designed on a silicon substrate, capable of converting incoming photons to electrons.

4. A method for improving a dynamic range of a CMOS image sensor by pixel-embedded amplification, the method comprising:
   receiving, by a CMOS image sensor, an electromagnetic radiation for a predetermined duration on a pixel array when a reset switch is deactivated, wherein the pixel array comprises of a plurality of photodiodes;

releasing, by the CMOS image sensor, an input electronic signal by an excitation of a depletion region of the plurality of photodiodes, wherein the released input electronic signal, due to the releasing of electrons, is temporarily stored in a storage node;

transferring, by the CMOS image sensor, the input electronic signal from the storage node to a gate of an in-pixel amplifier, wherein the in-pixel amplifier is configured as a capacitor;

modulating the capacitance of the in-pixel amplifier by changing the depletion and/or inversion state of the in-pixel amplifier, for a voltage-build, wherein the voltage build-up augments gain of the input electronic signal to a predetermined level;

alternating, by the CMOS image sensor, the in-pixel amplifier to a switched biasing mode for suppression of low-frequency noise signals;

rendering, by the CMOS image sensor, a resultant output electronic signal with increased gain; and an in-pixel switch, for dynamically toggling the in-pixel amplifier as a capacitor and as a source follower.

5. A method for improving a dynamic range of a CMOS image sensor by pixel-embedded amplification, the method comprising:

receiving, by a CMOS image sensor, an electromagnetic radiation for a predetermined duration on a pixel array when a reset switch is deactivated, wherein the pixel array comprises of a plurality of photodiodes;

releasing, by the CMOS image sensor, an input electronic signal by an excitation of a depletion region of the plurality of photodiodes, wherein the released input electronic signal, due to the releasing of electrons, is temporarily stored in a storage node;

transferring, by the CMOS image sensor, the input electronic signal from the storage node to a gate of an in-pixel amplifier, wherein the in-pixel amplifier is configured as a capacitor;

modulating the capacitance of the in-pixel amplifier by changing the depletion and/or inversion state of the in-pixel amplifier, for a voltage-build, wherein the voltage build-up augments gain of the input electronic signal to a predetermined level;

alternating, by the CMOS image sensor, the in-pixel amplifier to a switched biasing mode for suppression of low-frequency noise signals;

rendering, by the CMOS image sensor, a resultant output electronic signal with increased gain; and processing the resultant output electronic signal, by suppression of low-frequency noise signals, wherein the processing comprises:

segregating the input signal from the low-frequency noise signals during the voltage build-up in the capacitance mode; and suppressing residual noise signals by a parasitic capacitance operation by grounding the residual noise signals in the switched biasing mode.

6. A CMOS image sensor which enhances a signal to noise ratio in a low-light environment, the CMOS image sensor, comprising:

a processor; and a memory communicatively coupled to the processor, wherein the memory stores processor instructions, which on execution, causes the pixel array to:

receive an electromagnetic radiation, for a predetermined duration on a pixel array when a reset switch is deactivated, wherein the pixel array comprises a plurality of photodiodes;

release an input electronic signal by an excitation of a depletion region of the plurality of photodiodes, wherein the released input electronic signal, due to release of electrons, is temporarily stored in a storage node;

transfer the input electronic signal from the storage node to a gate of an in-pixel amplifier, wherein the in-pixel amplifier is configured as a capacitor;

the in-pixel amplifier is modulated to vary the capacitance of the sense node for a voltage build-up, wherein the voltage build-up augments gain of the input electronic signal to a predetermined level;

alternate the in-pixel amplifier to a switched biasing mode for suppression of low-frequency noise signals; and render a resultant output electronic signal with an increased gain.

7. The CMOS image sensor as claimed in claim 6, wherein the electromagnetic radiation is in the range of near infrared to visible light.

8. The CMOS image sensor as claimed in claim 6, wherein the plurality of photodiodes is designed on a silicon substrate, capable of converting incoming photons to electrons.

9. The CMOS image sensor as claimed in claim 6, further comprising an in-pixel switch, for dynamically toggling the in-pixel amplifier as a capacitor and as a source follower.

10. The CMOS image sensor as claimed in claim 6, further comprises processing the resultant output signal, by suppression of low-frequency noise signals, wherein the processing:

segregates the input signal from the low-frequency noise signals during the voltage build-up in the capacitance mode; and suppresses residual noise signals by a parasitic capacitance operation in the switched biasing mode.

11. An improved high dynamic range CMOS image sensor uses in-pixel amplification and switched biasing of the in-pixel amplifier to enhance a signal to noise ratio in the low-light environment, the CMOS image sensor comprises of:

a photodetector, comprising of photodiodes, which receives electromagnetic radiation for a predetermined duration on a pixel array, wherein the predetermined duration is an integration time or an exposure time;

an in-pixel amplifier, configured to alternate between modes of capacitance and switched biasing;

an in-pixel switch, configured to dynamically toggle the in-pixel amplifier between the capacitance mode and the switched biasing mode;

a parasitic capacitor, connected to the ground and which is further configured to remove stray noise signals to the ground;

a storage node, configured to temporarily store accumulated electrons, generated due to the photoelectric effect on the photodiode; and a plurality of switches which is configured to act as control switches.

12. The improved high dynamic range CMOS image sensor as claimed in claim 11, wherein the photodiode is an n-well/p-sub photodiode or a p+/n-well/p-sub pinned photodiode.

13. The improved high dynamic range CMOS image sensor as claimed in claim 11, wherein the photodiode is present in every pixel in the pixel array.

14. The improved high dynamic range CMOS image sensor as claimed in claim 11, wherein the electromagnetic radiation incident on the photodiode, releases electrons in a depletion region, which is stored on the gate of the in-pixel amplifier working as a capacitor.

15. The improved high dynamic range CMOS image sensor as claimed in claim 11, wherein during the capacitance mode, the in-pixel switch is configured to enable modulation of the capacitance to optimized levels to obtain a desired voltage of the stored electrons.

16. The improved high dynamic range CMOS image sensor as claimed in claim 11, wherein the in-pixel amplifier alters to the switched biasing mode for suppression of the low-frequency noise signals.

17. The improved high dynamic range CMOS image sensor as claimed in claim 11, wherein the in-pixel switch is further configured for both capacitance amplification and readout.

18. The improved high dynamic range CMOS image sensor as claimed in claim 11, wherein the in-pixel switch is further connected to the plurality of control switches.

19. The improved high dynamic range CMOS image sensor as claimed in claim 11, wherein the plurality of control switches comprises at least of a reset switch, a select switch and the alternator switches.

20. The improved high dynamic range CMOS image sensor as claimed in claim 19, wherein the reset switch resets the photodiode and the select switch is configured to operate with one of the alternator switches in the switched biasing mode.

21. The improved high dynamic range CMOS image sensor as claimed in claim 19, wherein the control switches is configured to enable the in-pixel amplifier to alternate from the capacitance mode to the switched biasing mode, wherein the one or more alternator switches is further configured to alternately operate with a plurality of control switches, in each of the capacitance mode and the switched-biasing mode of the in-pixel amplifier.

22. The improved high dynamic range CMOS image sensor as claimed in claim 11, wherein the configurable capacitor is configured to operate in the switched biasing mode.

* * * * *